United States Patent
Shahmiri et al.

(10) Patent No.: US 12,502,124 B2
(45) Date of Patent: Dec. 23, 2025

(54) DIAGNOSIS AND MONITORING OF BRUXISM USING EARBUD MOTION SENSORS

(71) Applicant: Apple Inc., Cupertino, CA (US)

(72) Inventors: Seyedeh Fereshteh Shahmiri, Atlanta, GA (US); Jun Gong, Austin, TX (US); Gierad Laput, Pittsburgh, PA (US); Mengying Fang, Pittsburgh, PA (US); Ke-Yu Chen, San Ramon, CA (US); Runchang Kang, Melrose, MA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 17/709,322

(22) Filed: Mar. 30, 2022

(65) Prior Publication Data
US 2022/0313153 A1  Oct. 6, 2022

Related U.S. Application Data

(60) Provisional application No. 63/168,255, filed on Mar. 30, 2021.

(51) Int. Cl.
*A61B 5/00* (2006.01)
*G06N 20/10* (2019.01)

(52) U.S. Cl.
CPC .......... *A61B 5/4557* (2013.01); *A61B 5/6815* (2013.01); *G06N 20/10* (2019.01); *A61B 2562/0204* (2013.01); *A61B 2562/0219* (2013.01)

(58) Field of Classification Search
None
See application file for complete search history.

(56) References Cited

U.S. PATENT DOCUMENTS

| 2015/0164377 A1* | 6/2015 | Nathan | A61B 5/6802 600/595 |
| 2018/0317789 A1* | 11/2018 | Ransbury | A61B 5/308 |
| 2022/0218273 A1* | 7/2022 | Barnacka | A61B 7/003 |

FOREIGN PATENT DOCUMENTS

WO   WO-2019194843 A1 * 10/2019 ........... A61B 5/0022

OTHER PUBLICATIONS 1.4. Support Vector Machines. scikit. (Feb. 5, 2012). https://scikit-learn.org/stable/modules/svm.html (Year: 2012).*
Yoshimi, H., Sasaguri, K., Tamaki, K., & Sato, S. (2009). Identification of the occurrence and pattern of masseter muscle activities during sleep using EMG and accelerometer systems. Head & Face Medicine, 5(1). https://doi.org/10.1186/1746-160x-5-7 (Year: 2009).*

* cited by examiner

*Primary Examiner* — John R Downey
*Assistant Examiner* — Anant A Gupta
(74) *Attorney, Agent, or Firm* — Fish & Richardson P.C.

(57) ABSTRACT

Enclosed are embodiments for diagnosis and monitoring of bruxism using earbud motion sensors. In an embodiment, a method comprises: receiving, with at least one processor, a signal derived from a motion sensor in an earbud, wherein the signal is captured while the earbud is inserted in an ear of a user; segmenting, with the at least one processor, the signal into segments; extracting, with the at least one processor, features from the segments; classifying, with the at least one processor, the features; and determining, with the at least one processor, that orofacial activity is predicted based on the classifying.

19 Claims, 6 Drawing Sheets

DIAGNOSIS AND MONITORING OF BRUXISM USING EARBUD MOTION SENSORS

RELATED APPLICATIONS

This application claims the benefit of priority from U.S. Provisional Patent Application No. 63/168,255, filed Mar. 30, 2021, the entire contents of which are incorporated herein by reference.

TECHNICAL FIELD

The description that follows relates to health monitoring systems.

BACKGROUND

Teeth grinding and jaw clenching (aka bruxism) are the most common parafunctional behavior manifested during sleep and awakeness. Although the causes of bruxism are not always clear, awake bruxism has been mostly associated with emotions like anxiety and stress, anger, frustration or tension, and sleep bruxism to sleep disorders and arousals during sleep. Due to the nature of bruxing behavior that is to be unconscious and involuntary, individuals are mostly unaware of the occurrence and the severity of their bruxing habits. This unawareness results in myriad orofacial muscle pain and dental consequences like teeth damage, wear, and fractures.

Recent decades have seen tremendous studies and commercial devices in dental practice to monitor and treat bruxism. The majority of those studies have targeted the use of polysomnography (PSG) and electromyography (EMG) sensor data, collected from masticatory muscle activities, as the main monitoring strategy. These approaches, although accurate enough for facial muscle activity detections, have critical usability limitations in terms of (1) cost, (2) convenience for frequent use in daily routines, and (3) inability of discrimination between muscle activities caused by bruxing and other common orofacial activities.

For instance, PSG studies that target the monitoring of sleep bruxism, require patients to sleep in a clinical setting overnight. Obviously, the adjustment to a new sleep environment and sensor attachments discomfort patients and disrupt their sleep routine. Further, it restricts the recording of PSG data to a limited time, e.g., a single night. Similar to PSG, most portable and wearable EMG-based devices that are developed for the out of clinic use, require individuals to attach the EMG electrodes on face muscles. This obtrusive approach degrades sleep quality and discomforts users involved in normal awake activities.

In results, PSG and EMG-based solutions provide limited practicality based on two main reasons. First, they can't accurately capture the time-variant nature of bruxism phenomena that its presence and severity may vary from time to time. Second, they can't help in early diagnosis of bruxism and the prevention of destructive consequences that bruxing habit causes, as they mostly target those with severe bruxism. In fact, those with mild or mediate bruxism that are mostly unaware of their unconscious habitual disorder, never go under those types of cumbersome studies.

SUMMARY

Enclosed are embodiments for diagnosis and monitoring of bruxism using earbud motion sensors. In an embodiment, a method comprises: receiving, with at least one processor, a signal derived from a motion sensor in an earbud, wherein the signal is captured while the earbud is inserted in an ear of a user; segmenting, with the at least one processor, the signal into segments; extracting, with the at least one processor, features from the segments; classifying, with the at least one processor, the features; and determining, with the at least one processor, that orofacial activity is predicted based on results of the classifying.

In an embodiment, the signal is a vibration in an audio frequency band output by an accelerometer in the earbud.

In an embodiment, prior to extracting, the signal is pre-processed to remove silent segments.

In an embodiment, prior to extracting, the signal is pre-processed to remove segments having energy below a specified threshold.

In an embodiment, the signal comprises windows of signal samples and the method further comprises: prior to segmenting the signal: computing an energy of each window of signal samples; computing a median value of the energies of the windows of signal samples; determining a portion of the median value as a power threshold; and adding together windows having an average energy that exceeds the power threshold to reconstruct the signal to be segmented.

In an embodiment, extracting features from the segments, further comprises: extracting short-term features using a first sampling window; extracting mid-term statistical features using a second sampling window longer than the first sampling window; and long-term averaging the mid-term statistical features using a third sampling window longer than the first and second sampling windows.

In an embodiment, the short-term features include time domain and frequency domain features.

In an embodiment, the classifying is implemented using a support vector machine (SVM) classifier with a linear kernel.

In an embodiment, the signal amplitude is normalized as a percent of maximum voluntary clenching (MVC).

In an embodiment, classifications are provided in multi-class and binary formats.

One or more of the disclosed embodiments provide one or more of the following advantages. Motion sensors (e.g., accelerometers) in earbuds (e.g., Apple Inc.'s AirPods®) are used to address the inconvenience and intrusiveness of EMG-based devices, and effectively discriminate between bruxism and other orofacial activities. Earbuds are lightweight and convenient to use. The cost of reinforcing earbuds with an orofacial activity monitoring platform is trivial, though it highly benefits individuals' self-awareness of their oral parafunctional habits. Using earbuds as an off the shelf device, with no need for user instrumentation allows convenient capturing of orofacial activities in daily routines, unobtrusively and in a socially acceptable way unlike other wearable monitoring devices.

The location of the earbuds is a proper spot to capture distinct profiles of teeth activities. The sound vibrations produced by teeth motions reach the inner ear by the conduction through the bones of the skull, thus, bony prominence like the mastoid part of the temporal bone and also ear canal are appropriate locations to locate the transducer and directly sense those vibrations.

The high bandwidth (16 KHz) of the earbuds accelerometers provide many opportunities beyond common accelerometers. It allows us to sense vibration signatures in the audio band (e.g., 20 Hz to 20 kHz) like using a contact microphone, while the recorded data is not sensitive to airborne sound and a wide range of background noise. This capability provides high quality signals that ease discrimination among orofacial activities, accurate diagnosis of bruxing and confident rejection of false positive predictions (non-bruxing events).

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

Bruxism Overview

Bruxism is an involuntary, unconscious, and excessive orofacial motor activity behavior. This parafunctional behavior manifests during both wakefulness (i.e., awake bruxism) and sleep (i.e., sleep bruxism). Although the causes of bruxism are not always clear, awake bruxism has been mostly associated to emotions like anxiety and stress, anger, frustration or tension, while sleep bruxism to sleep disorders and arousals during sleep. Sleep bruxism and awake bruxism have different kinematic properties. For instance, in sleep bruxism, grinding and in awake one clenching is more prominent.

According to the international consensus of experts for the diagnosis and treatment of bruxism, sleep bruxism is the third most common sleep disorder, occurring in about 10% to 13% of the population, with a lack of awareness from about 80% of the bruxers. Awake bruxism is relatively common involving 22% to 30% of the adult population and 18% to 20% of children, while less than 10% of those who suffer are ever diagnosed and receive treatment. Hence, lack of patient awareness of their sleep bruxism and, underreported awake bruxism result in myriad dental consequences like teeth damage, wear, and fractures, masticatory muscle fatigue, orofacial pain, etc.

Figure 1:
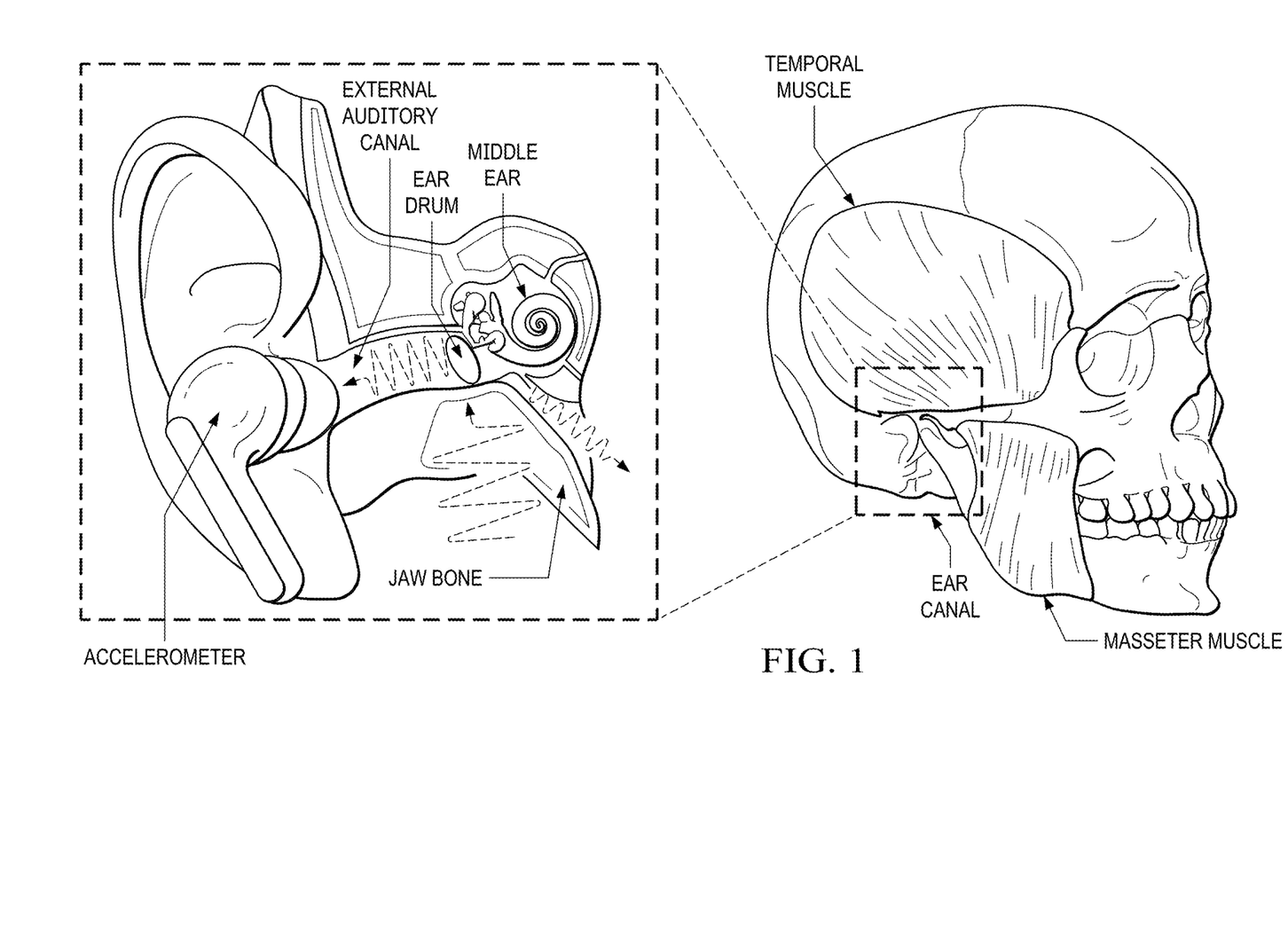
FIG. 1 illustrates an earbud inserted in the ear of a user and the accelerometer capturing sound vibrations in the audio band caused by bruxism events, according to some embodiments.

FIG. 1 illustrates an earbud inserted in the ear of a user and the accelerometer capturing sound vibrations caused by bruxing events, according to some embodiments. FIG. 1 also illustrates the temporal and masseter facial muscles which contract during bruxing events, such as teeth clenching and griding, according to some embodiments.

Bruxism is characterized by periodic repetitive clenching and rhythmic forceful grinding of the teeth. When clenching, masseter muscle contractions are either tonic or phasic. In tonic way, teeth are hold together and jaw muscles are tightened for at least 2.0 seconds and then relaxed. Tightening and relaxing muscles are often accompanied with tooth click sounds produced by molar teeth. In phasic contractions, clenching occurs with short intervals, about 0.5-1.0 second time and there is no vertical separation of the upper and lower teeth when masseter muscles are tightened and relaxed. Tooth click sounds may or may not exist, though often there is a friction sound produced by upper and lower molar teeth. When grinding teeth are forcefully move side by side or forward and backward. The first is called lateral and the second is protrusive grinding. In lateral way, the lower front teeth rub on the back of the upper front teeth and the mandible slides with upper and lower canines in contact. In protrusive grinding, jaw slides forward and backward and upper and lower incisors (front teeth) are touching and rubbing each other. In grinding there is no occasional contact caused by molar teeth as it often happens in clenching.

The current gold standard method to identify the presence and severity of sleep bruxism is polysomnography (PSG). In this method, EMG signals are collected from masticatory muscle activities while the individual is asleep. PSG studies these signals with respect to their duration, peak, and frequency of muscle movements in phasic or tonic muscle contractions. As shown in Table I, according to Lavigne's classification criteria based on PSG scores, phasic bruxing corresponds to at least three EMG bursts of 0.25-2.0 second duration, and tonic one corresponds to an EMG burst that lasts more than 2.0 seconds. Clenching is mostly tonic whereas grinding is mostly in phasic pattern.

TABLE I

Lavigne's classification criteria to quantitatively define bruxing events. This criterion is supported by PSG scores.

| Teeth Activity | Muscle Activity | EMG Burst(s) Behavior |
| --- | --- | --- |
| Clenching and Grinding | Tonic Muscle Contraction (long-term, low-fluctuation signals) Phasic Muscle Contraction (short-term, transient peaks) | Sustained EMG bursts lasting more than 2.0 seconds. 3 or more rhythmic EMG bursts of 0.25-2.0 second in duration |

The signal amplitude identifies specific thresholds that indicate the occurrence of the bruxing events. The most commonly accepted threshold is at least 20% of the signal amplitude where individual's masticatory muscles are in maximum voluntary contraction (MVC). This threshold allows discarding oral motor activities, such as coughing, deglutition and talking while sleeping, which could be confused with captured bruxism events.

The severity of bruxism events is classified in three levels of mild, moderate and severe and is determined with multiple variables. Those variables are 1) number of events per hour of sleep, 2) total duration of events, and 3) maximum voluntary contraction and average amplitude of EMG bursts.

Most existing bruxism monitoring devices in dental practice lack convenient and unobtrusive monitoring of facial muscles in for a reasonable amount of time, and in real context of daily routine activities. Because of their inconvenience, they have been mainly used only for sleep bruxism studies that lasted for short duration of time. The disclosed embodiments address these shortcomings by using the motion sensors (e.g., accelerometers) present in many commercially available earbuds used for audio playback for unobtrusive and longitudinal monitoring of orofacial activities. High frequency sampling of acceleration signals allows capture of characteristic sound profiles from orofacial activities and collect a high-quality signal in the audio band that is not sensitive to airborne sounds and environment noise.

The sound vibrations produced by teeth motions (e.g., clenching or grinding), propagate through facial tissue and bones of the skull and then, reach the inner ear. Bony parts of the skull, like the mastoid part of the temporal bone and inside the ear canal are the most reliable locations to directly capture those vibration signals in the audio band. The collected accelerometer signals can be used to discriminate between bruxing or other common activities similar to bruxing, such as, for example, eating, drinking, talking, etc.

Although being capable to roughly discriminate among different activities, the location of the device in the ear may capture low-frequency noise/signals from head motions when performing the activities. Thus, in an embodiment, the captured accelerometer signal is passed through a high pass filter (e.g., 160 Hz cutoff) and then analyzed to determine whether a bruxing event has occurred or whether it was simply noise from other orofacial activities.

Figure 3:
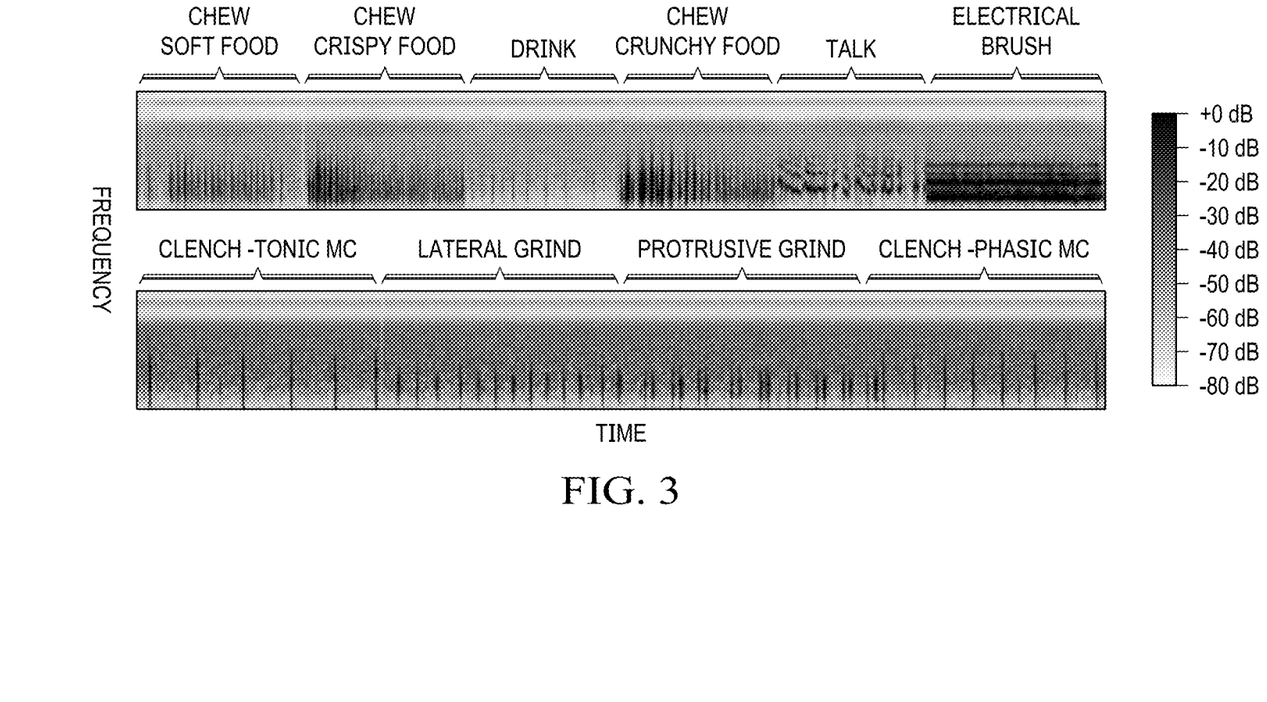
FIG. 3 are spectrogram plots of example acoustic profiles of orofacial activities, according to some embodiments.

FIG. 3 are spectrogram plots of example acoustic profiles of orofacial activities, according to some embodiments. The vertical axis is frequency and the horizontal axis is time. Note the different spectra for the different orofacial activities, which can be differentiated from spectra for bruxism using the embodiments described below.

Example System

Figure 2:
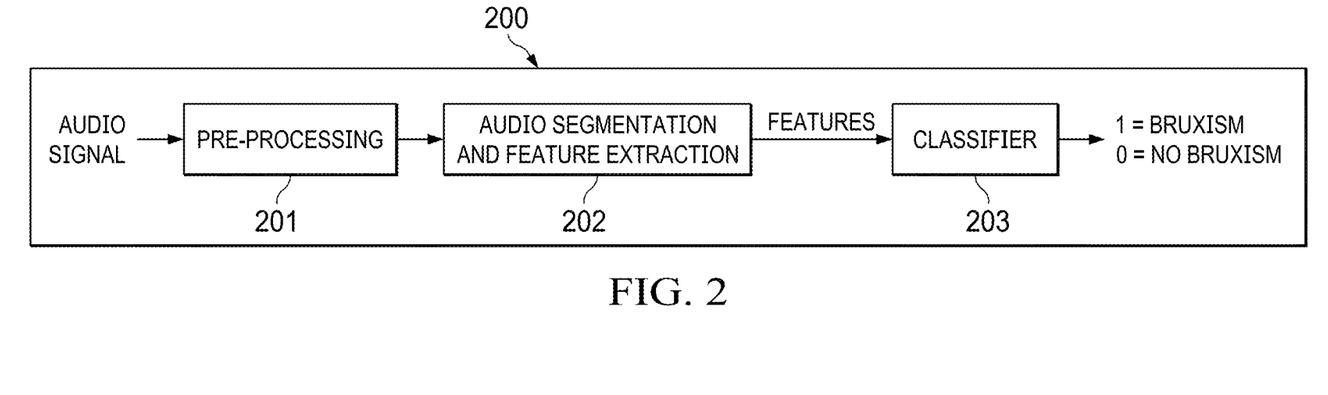
FIG. 2 is a block diagram illustrating a system for diagnosing and monitoring bruxism, according to some embodiments.

FIG. 2 is a block diagram of a system 200 for diagnosing and monitoring bruxism, according to an embodiment. System 200 includes pre-processing stage 201, audio segmentation and feature extraction stage 202 and classification stage 203. Each stage is described in turn below.

Pre-Processing Stage

Pre-processing stage 201 is configured to remove silent and low energy segments in an audio signal to ensure proper data is fed into the classification stage 203. In an embodiment, the average energy for each N second window (e.g., N=3) of raw acceleration samples is computed. The energy is computed as the sum of the squared amplitude of acceleration samples divided by the number of acceleration samples in the window. A median value of the squared amplitude of the acceleration samples is computed, and X % (e.g., 80%) of the median value is selected as a power threshold. Windows with an average energy that exceeds the power threshold are added together and used to reconstruct the acceleration signal to be processed by audio segmentation and feature extraction phase 202.

Audio Segmentation and Feature Extraction Stage

Figure 5:
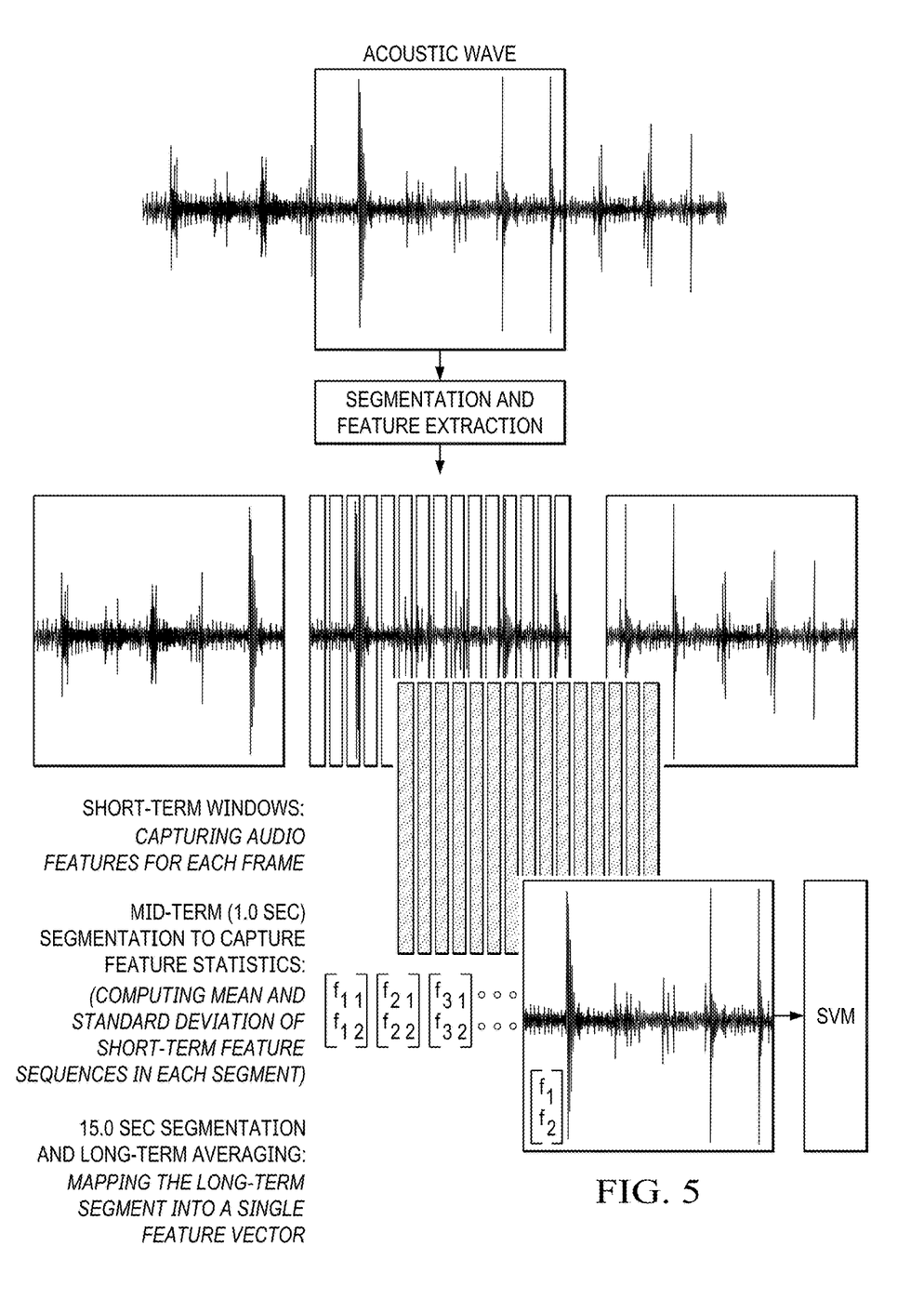
FIG. 5 illustrates a multi-stage audio segmentation and feature extraction process, according to some embodiments.

FIG. 5 illustrates a multi-stage, audio segmentation and feature extraction process, according to some embodiments. Because of a wide range of temporal and spectral variations in different orofacial activities, multiple stages of audio segmentation are used for feature extraction and classification.

In a first stage of audio segmentation, short-term audio features are extracted from a segment of the audio signal (e.g., vibration in the audio band output by an accelerometer). Since the minimum duration of a signal burst caused by bruxing is about 0.25 sec, this time duration was chosen as a short-term sampling window (frame) size. In an embodiment, X % (e.g., 50%) overlapping sampling windows are used to extract the short-term features from the audio segment. This computation produces a sequence of short-term feature vectors, each containing N elements (e.g., 68 short-term features). Short-term feature vectors can include both time-domain features and frequency-domain features. Some examples of short-term features include but are not limited to: zero crossing rate, energy and energy entropy, spectral-centroid, spectral-spread, spectral-entropy, spectral-flux and spectral-rolloff, Mel-frequency cepstral coefficients (MFCC), and chroma features.

In a second stage of audio segmentation, mid-term statistical features are extracted using longer sampling windows (e.g., 1.0 second windows with 50% overlap). Overlapping sliding windows are used to ensure that the desired mid-term features are captured. For each audio segment, a set of statistical features (i.e., mean and standard deviation) are extracted from the mid-term features.

In a third stage of audio segmentation, long-term averaged features are extracted from mid-term segments. For example, a long-term averaging is applied to an N second (e.g., N=15 second) mid-term segment to map the mid-term statistics into a single feature vector, so that the overall audio signal is represented as a single average feature vector of mid-term statistics, which is input into a classifier (e.g., using SVM) that is trained to predict/infer a result in multi-class and/or binary format, e.g., "1" for orofacial activities present and "0" for no orofacial activities present.

Figure 6:
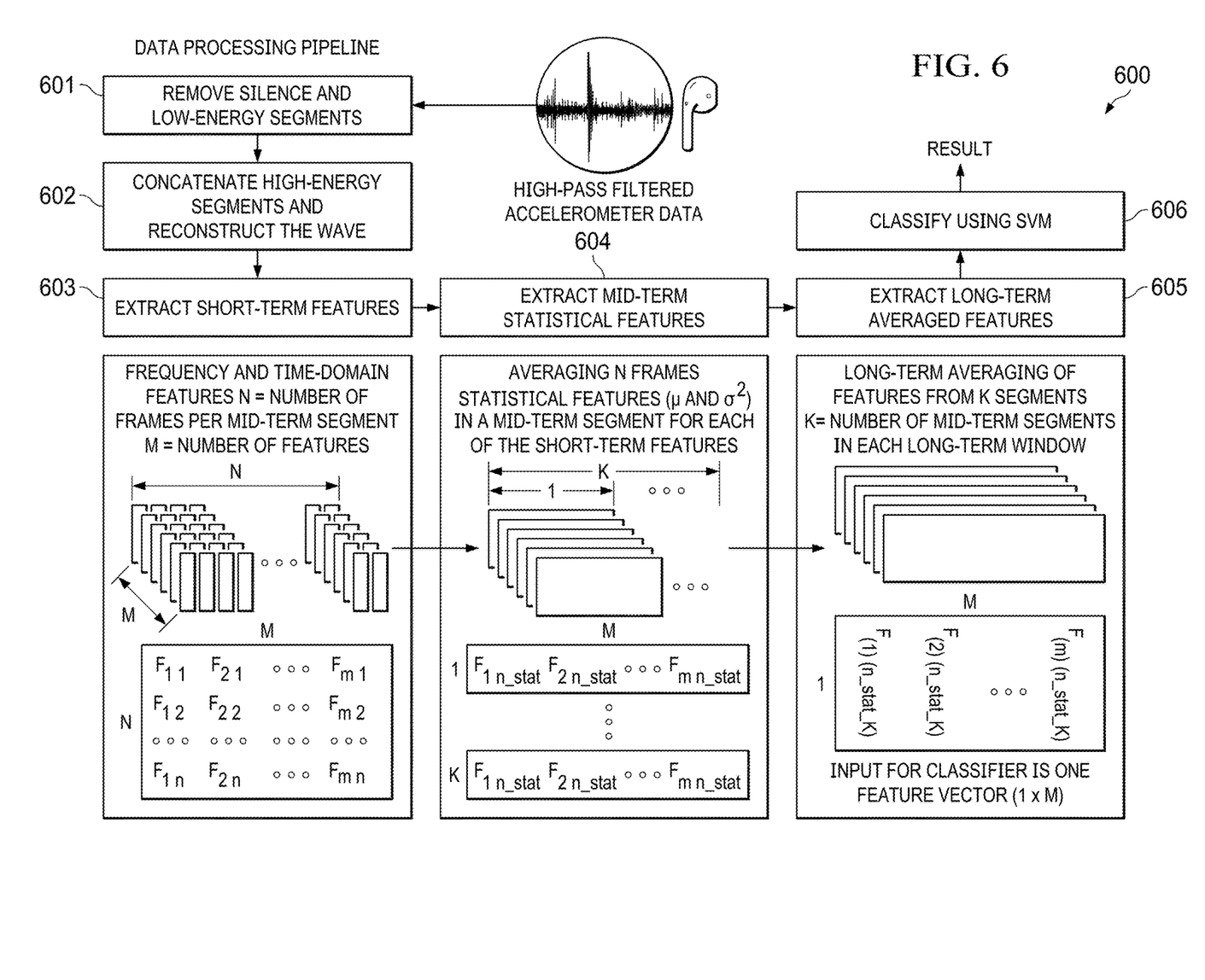
FIG. 6 is a flow diagram of a data processing pipeline for diagnosing and monitoring bruxism events, according to some embodiments.

FIG. 6 is a flow diagram of a data processing pipeline 600 for diagnosing and monitoring bruxism events, according to some embodiments.

In a first stage of audio segmentation, silence and low energy segments are removed (601), and the remaining high-energy segments are concatenated and used to reconstruct the audio/acoustic waveform (602). Short-term features are extracted from the reconstructed audio/acoustic waveform using a first sampling window (603).

In a second stage of audio segmentation, mid-term statistical features are extracted using a second sampling window longer than the first sampling window (604). For example, if there are N number of frames in each mid-term segment, then M (e.g., M=68) number of short-term features are extracted for each frame. In mid-term segments, the feature vector constructed from N frames is averaged and creates a 1×M dimensional matrix per segment that will be the input data fed into the third stage of segmentation.

In a third stage of audio segmentation, long-term averaged features are computed using a third sampling window longer than the first and second sampling windows (605). The input to this stage is K number of 1×M dimensional mid-term feature vectors. In the third stage of segmentation, a second statistical feature extraction is performed by averaging the K mid-term feature vectors (that were the output from the second stage of audio segmentation) in each long-term window.

The long-term average features (e.g., as a single feature vector) are input into a machine learning classifier (e.g., a SVM), which predicts a result in multi-class and/or binary format, e.g., "1" for bruxism and "0" non-bruxism (606). Other outputs of the classifier are also possible, including but not limited to a confidence value.

Figure 4:
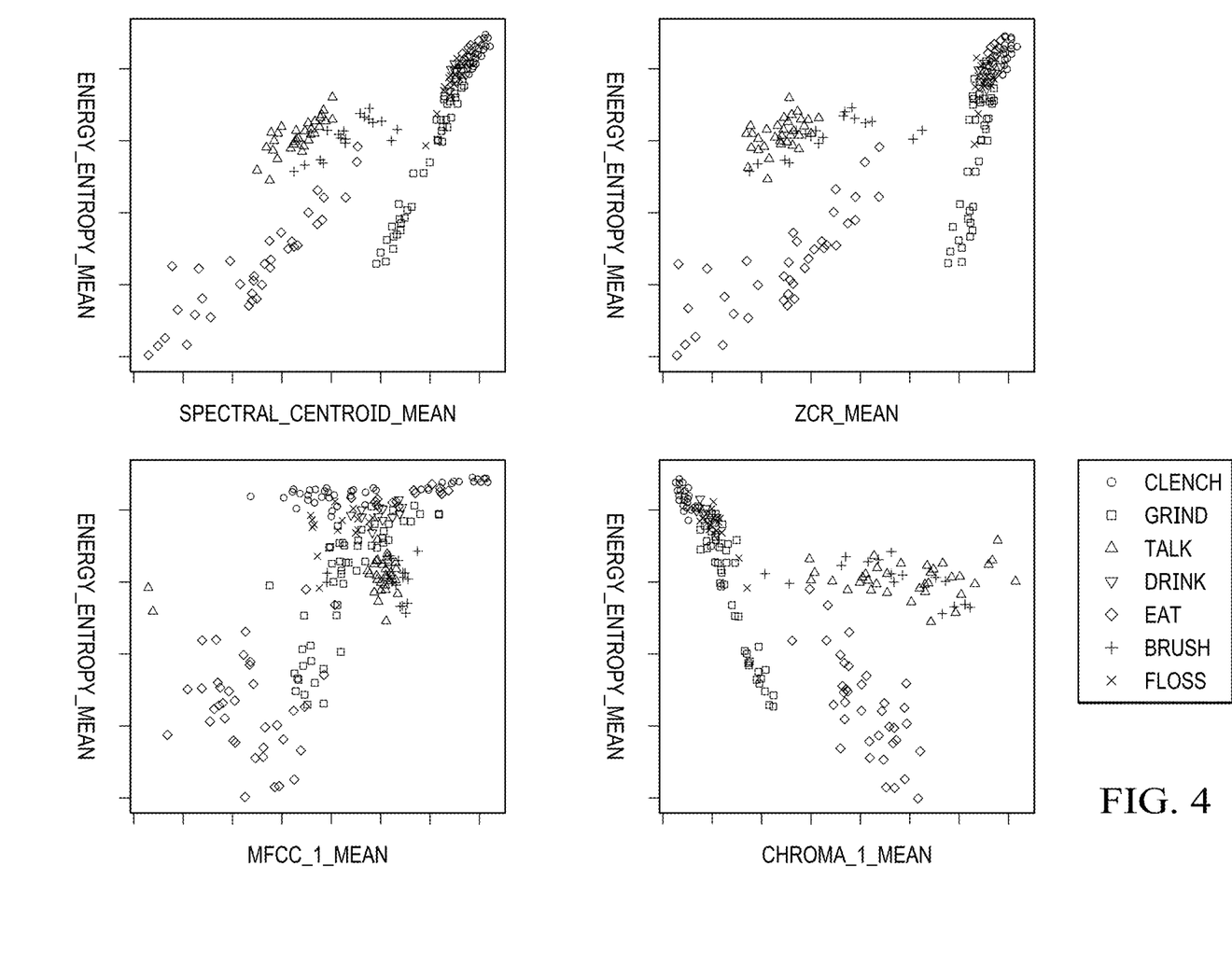
FIG. 4 are scatter plots illustrating how various short-term and statistical features can be used to distinguish bruxism events from other events, according to some embodiments.

FIG. 4 are scatter plots illustrating how various short-term and statistical features can be used to distinguish bruxism events from other events, according to some embodiments. The scatter plots show the short-term features of spectral centroid mean, zero crossing mean, MFCC mean and chroma mean for clenching, grinding, talking, drinking, eating, brushing and flossing activities. As can be observed from these plots, the short-term and statistical features form clusters that can be used to distinguish from bruxism.

Classification Stage

The featurization scheme described above may produce false positive predictions. Up to this point, only general analysis rules have been applied to analyze the acoustic signal coarsely, and no actual classification has been performed. In classification stage 203, a machine learning model classifier is used to classify the features. In an embodiment, a support vector machine (SVM) classifier with a linear kernel is used, and SVM-based classifications are provided in multi-class and binary formats. Note that in an embodiment the SVM model classifier does not operate on raw signals but rather on their feature representation.

Other examples of machine learning classifiers that can be used in the classification stage 203 include but are not limited to: perceptron's, Naive Bayes, Decision Tree, Logistic Regression, K-Nearest Neighbor, Artificial Neural Networks/Deep Learning. In some embodiments, ensemble methods can be used for classification, including but not limited to: Random Forest, Bagging and AdaBoost.

For the binary output format, and for every extracted audio segment, the SVM classifier filters out portions of data that do not correspond to bruxing events but rather corresponds to noise and accumulation of all orofacial activities as a non-bruxing class. Thus, the SVM classifier signals that bruxism is predicted based on the features (e.g., binary "1") or not predicted based on the features (e.g., binary "0").

In an embodiment, the machine learning model was trained on bruxism data and other orofacial activities. For bruxism data, participants were asked to perform four different tasks (detailed below) based on dental practice studies. For each bruxism task, the experimenter gave instructions verbally and showed a corresponding illustration figure or an animation video. Care was taken to ensure that participants had correctly learned how to perform those tasks before data was collected. The task sequence was counterbalanced across participants to avoid confounding effects. For the other orofacial activities, four common tasks were included (i.e., eating, drinking, talking and oral hygiene) because each of these tasks may create similar vibrations that could result in the machine learning classifier producing false positives. Participants followed a pre-generated activity sequence to ensure they did not perform repetition of tasks all at once or confounding with other activities.

Additionally, for bruxism data collection participants were asked to perform three maximum voluntary clenching (MVC) tasks, where the participants clenched their teeth as hard as they could for 2-3 seconds for each clench, and each clench was separated by 10 seconds of rest. The greatest of the MVC measures was then used for normalizing the accelerometer signal amplitude as a percent of MVC that should be counted as the presence of the bruxing events. The participants were then asked to clench and grind their teeth in multiple activities as follows:

Task 1: Clenching with tonic muscle contraction. Participants clench and hold teeth together while tightening the jaw muscles for 2-3 seconds and then relax the muscles. When clenching, they most probably hear a tooth click sound, and when they release their masseter muscles, they may hear other teeth click sound, with less amplitude. Participants were asked to repeat clenching for 12 times.

Task 2: Clenching with phasic muscle contraction. Participants clench while ensuring there is no vertical separation of the upper and lower teeth when they tighten and relax the masseter muscles. They clench in short intervals, about 0.5-1.0 sec time. In phasic clenching participants may or may not hear any teeth click sound. However, they most probably hear a friction sound produced by upper and lower molar teeth. Participants were asked to repeat clenching for 30 times.

Task 3: Lateral grinding. Participants forcefully grind their teeth side by side, where the lower front teeth rub on the backs of the upper front teeth. In lateral grinding, the mandible slides with upper and lower canines in contacts. Participants were asked to repeat lateral grinding 30 times.

Task 4: Protrusive grinding. Participants grind their teeth with protrusive jaw movements, where they slide their jaw forward with the front teeth touching. The mandible slides in a protrusive excursion with upper and lower incisors (front teeth) in contact, and with no posterior occlusal contacts. Participants were asked to repeat protrusive grinding 30 times.

The performance of each task to 35-45 seconds, since a longer duration of facial muscle contractions cause muscle fatigue in the masseter. For the grinding tasks no definite time is set for participants and they were asked to perform grinding tasks with their own normal grinding pattern.

Because of the demanding nature of these tasks, participants were asked to rest for at least 3 minutes after each task to avoid muscular fatigue. Since it is difficult for individuals to exactly replicate these tasks similar to the actual unconscious teeth grinding or clenching in bruxism, we asked participants to repeat each task 3 times, when the sequence of tasks was counterbalanced across participants.

Other Orofacial Activities Data Collection

For other orofacial activities data collection, four common orofacial activities were identified: drinking, talking, eating (chewing and swallowing), and oral hygiene routines (teeth brushing and flossing) that might generate similar vibrations as bruxism behaviors. The participants were asked to perform the following tasks:

Task 1: Drink. Participants drink water for 30 seconds. Participants were asked to repeat for 4 times.

Task 2: Talk. Participants talk for 60 seconds. Participants were asked to repeat for 4 times.

Task 3: Oral Hygiene. Participants brush teeth for 60 seconds and Participants floss for 60 seconds.

Task 4: Eat. Participants eat 3 types of food—two servings for each type with 60.0 seconds duration. First type is soft food like cooked rice or yogurt. Second type is crunchy food like carrots and hard nuts. e.g., almonds. The third type is crispy food like potato chips or biscuits. Using this data, the difference between crispness and crunchiness was clarified, where in a crunchy food, molar tooth at the back of the mouth are involved in chewing, and in crispy foods, incisors (four pointy teeth at the front of the mouth) are involved in chewing.

To avoid strong correlation in samples because of the high frame rates of the audio data and the time series nature of the audio data, each repetition of the tasks above was separated, and participants were also asked to rest between repetitions.

To remove any potential randomness impact, multiple cross-validation approaches were applied including 10-fold validation, 'leave-one-session-out' and 'leave-one-subject-out' protocols. Using 'leave-one-session-out', the reproducibility of the results in different times for each user were evaluated. Using 'leave-one-subject-out', how well the system is generalizable and user-independent was evaluated.

For each participant, a 10-fold cross validation was conducted, where 90 percent of the data was used for training and the remaining 10 percent used for testing. The overall within-user accuracy was calculated by averaging the results from all the participants. In summary, the classification accuracy of the disclosed system across 5 participants was 96.62% (std=2.19%).

Since a main priority was to have almost equal sample size for main classes of bruxing and non-bruxing, data distribution for multiple classes of 'clench', 'grind", eat', 'talk', 'drink', 'brush', and 'floss' was imbalanced. To compensate for the effect of imbalanced data, up-sampling was performed on the training data to address the majority versus minority target class problem and to prevent the model from inclining towards the majority class. Then, stratified sampling in 5-fold cross validation was used to ensure the training and test sets had the same proportion of the feature of interest similar to the original dataset.

Figure 7:
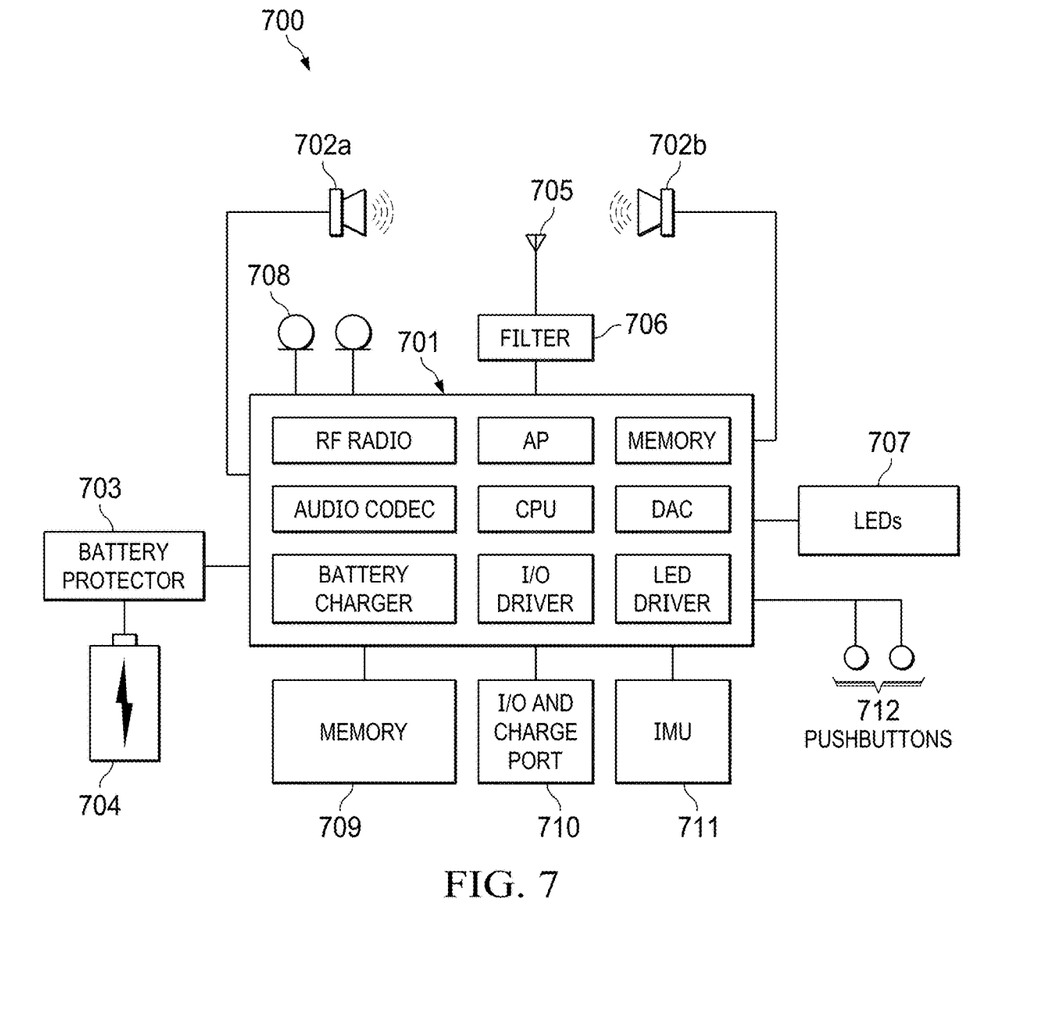
FIG. 7 is a block diagram of an earbud software/hardware architecture for implementing the features and processed described in reference to FIGS. 1-6, according to some embodiments.

FIG. 7 is a block diagram of a wired or wireless earbud software/hardware architecture 700 for implementing the features and processed described in reference to FIGS. 1-4, according to some embodiments. In an embodiment, architecture 700 can includes system-on-chip (SoC) 701, stereo loudspeakers 702a, 702b (e.g., ear buds, headphones, ear phones), battery protector 703, rechargeable battery 704, antenna 705, filter 706, LEDs 707, microphones 708, memory 709 (e.g., flash memory), I/O/Charge port 710, inertial measurement unit (IMU) 711 and pushbuttons 712 for turning the headset on and off, adjusting volume, muting, etc. IMU 711 includes, for example, a 3-axis MEMS gyro and a 3-axis MEMS accelerometer. The 3-axis MEMS accelerometer can provide the acceleration data from which vibrations due to bruxism or other orofacial activities is derived as described in reference to FIGS. 1 and 2.

SoC 701 further includes various modules, such as a radio frequency (RF) radio (wireless transceiver) for wireless bi-directional communication with other devices, such as a companion device (e.g., a smartphone, tablet computer, smartwatch, etc.). SoC 701 further includes an application processor (AP) for running specific applications, memory (e.g., flash memory), central processing unit (CPU) for managing various functions of the headsets, audio codec for encoding/decoding audio, battery charger for charging/recharging rechargeable battery 704, I/O driver for driving I/O and charge port (e.g., a micro USB port), digital to analog converter (DAC) converting digital audio into analog audio and LED driver for driving LEDs 707. Other embodiments can have more or fewer components.

In an embodiment, the acceleration data (vibrations) provided by accelerometers in the earbuds are streamed (e.g., wirelessly) to a companion device (e.g., a smart phone, smart watch, tablet computer, fitness band) or to a cloud-based computing platform to perform one or more of the process steps shown in FIGS. 5 and 6.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity

The invention claimed is:
1. A method comprising:
receiving, with at least one processor, a signal derived from a motion sensor in an earbud, wherein the signal is captured while the earbud is inserted in an ear of a user, wherein the signal comprises windows of signal samples;
computing an energy of each window of signal samples;
computing a median value of the energies of the windows of signal samples;
determining a portion of the median value as a power threshold; and
adding together windows having an average energy that exceeds the power threshold to reconstruct the signal;
segmenting, with the at least one processor, the signal into segments;
extracting, with the at least one processor, features from the segments;
classifying, the at least one processor, the features; and
determining, with the at least one processor, that orofacial activity is predicted based on the classifying.
2. The method of claim 1, wherein the signal is a vibration in an audio frequency band output by an accelerometer in the earbud.
3. The method of claim 1, wherein prior to extracting, the signal is pre-processed to remove silent segments.
4. The method of claim 1, wherein prior to extracting, the signal is pre-processed to remove segments having energy below a specified threshold.

5. The method of claim 1, wherein extracting features from the segments, further comprises:
    extracting short-term features using a first sampling window;
    extracting mid-term statistical features using a second sampling window longer than the first sampling window; and
    long-term averaging the mid-term statistical features using a third sampling window longer than the first and second sampling windows.

6. The method of claim 5, wherein the short-term features include time domain and frequency domain features.

7. The method of claim 1, wherein the classifying is implemented using a support vector machine (SVM) classifier with a linear kernel.

8. The method of claim 1, wherein an amplitude of the signal is normalized as a percent of maximum voluntary clenching (MVC).

9. The method of claim 1, wherein the classifying generates classifications in multi-class and binary formats.

10. A system comprising:
    at least one processor;
    memory storing instructions, that when executed by the at least one processor, causes the processor to perform operations comprising:
      receiving a signal derived from a motion sensor in an earbud, wherein the signal is captured while the earbud is inserted in an ear of a user, and wherein the signal comprises windows of signal samples;
      computing an energy of each window of signal samples;
      computing a median value of the energies of the windows of signal samples;
      determining a portion of the median value as a power threshold; and
      adding together windows having an average energy that exceeds the power threshold to reconstruct the signal;
      segmenting the signal into segments;
      extracting features from the segments;
      classifying the features; and
      determining that orofacial activity is predicted based on the classifying.

11. The system of claim 10, wherein the signal is a vibration in an audio frequency band output by an accelerometer in the earbud.

12. The system of claim 10, wherein prior to extracting, the signal is pre-processed to remove silent segments.

13. The system of claim 10, wherein prior to extracting, the signal is pre-processed to remove segments having energy below a specified threshold.

14. The system of claim 10, wherein extracting features from the segments, and the operations further comprise:
    extracting short-term features using a first sampling window;
    extracting mid-term statistical features using a second sampling window longer than the first sampling window; and
    long-term averaging the mid-term statistical features using a third sampling window longer than the first and second sampling windows.

15. The system of claim 14, wherein the short-term features include time domain and frequency domain features.

16. The system of claim 10, wherein the classifying is implemented using a support vector machine (SVM) classifier with a linear kernel.

17. The system of claim 10, wherein an amplitude of the signal is normalized as a percent of maximum voluntary clenching (MVC).

18. The system of claim 10, wherein the classifying generates classifications in multi-class and binary formats.

19. A method comprising:
    receiving, with at least one processor, a signal derived from a motion sensor in an earbud, wherein the signal is captured while the earbud is inserted in an ear of a user;
    segmenting, with the at least one processor, the signal into segments;
    extracting, with the at least one processor, features from the segments, wherein extracting features from the segments includes:
      extracting short-term features using a first sampling window;
      extracting mid-term statistical features using a second sampling window longer than the first sampling window; and
      long-term averaging the mid-term statistical features using a third sampling window longer than the first and second sampling windows;
    classifying, the at least one processor, the short-term features and the long-term averaged mid-term statistical features; and
    determining, with the at least one processor, that orofacial activity is predicted based on the classifying.

* * * * *